5 Sheets—Sheet 1.

T. A. EDISON.
SEXTUPLEX TELEGRAPH.

No. 512,872. Patented Jan. 16, 1894.

Witnesses
Chas. H. Smith
Harold Serrell

Inventor
Thos. A. Edison
per Lemuel W. Serrell
Atty

5 Sheets—Sheet 2.

T. A. EDISON.
SEXTUPLEX TELEGRAPH.

No. 512,872. Patented Jan. 16, 1894.

Witnesses
Chas. H. Smith
Harold Serrell

Inventor
Thos. A. Edison
per Lemuel W. Serrell
Atty

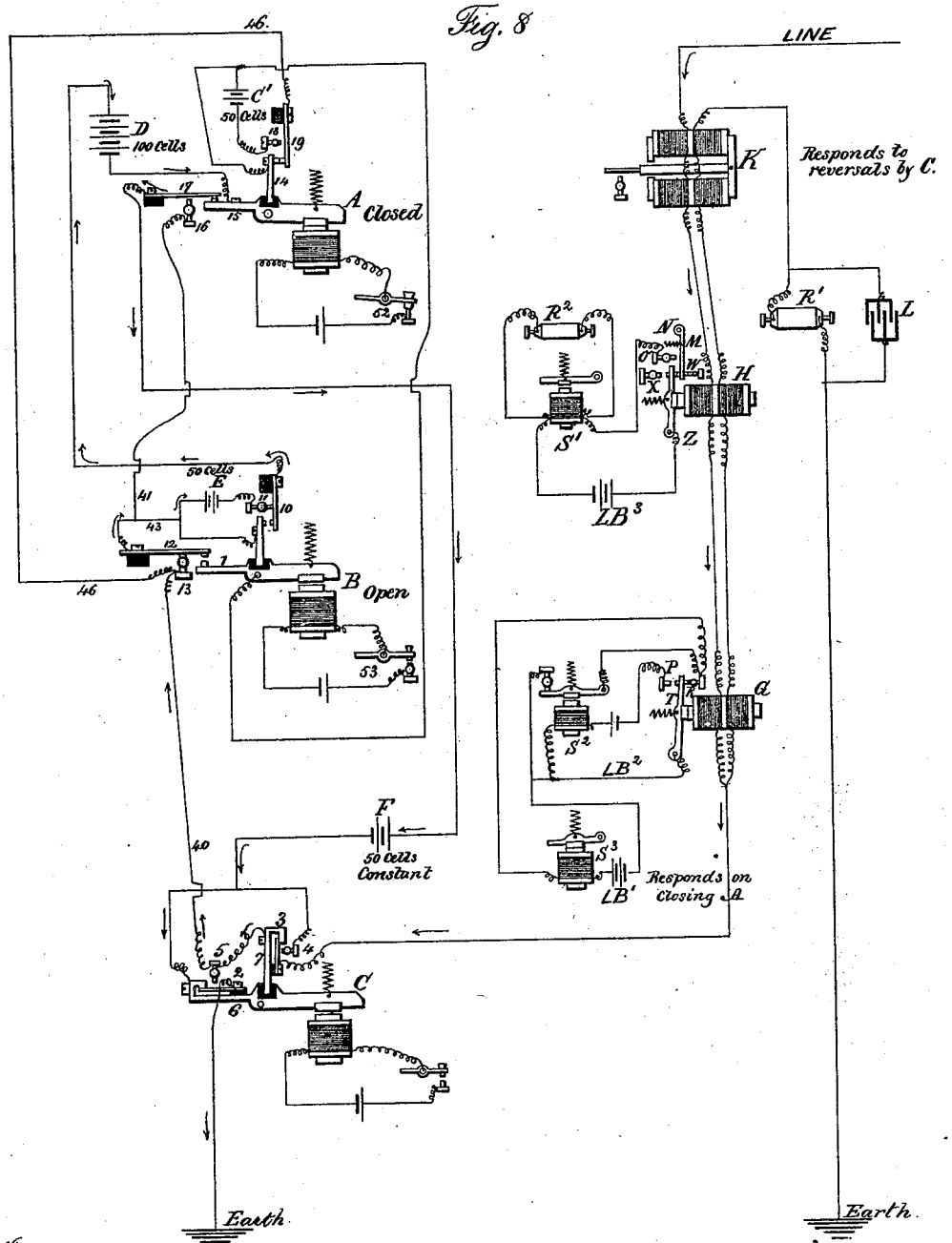

5 Sheets—Sheet 4.
T. A. EDISON.
SEXTUPLEX TELEGRAPH.
No. 512,872. Patented Jan. 16, 1894.
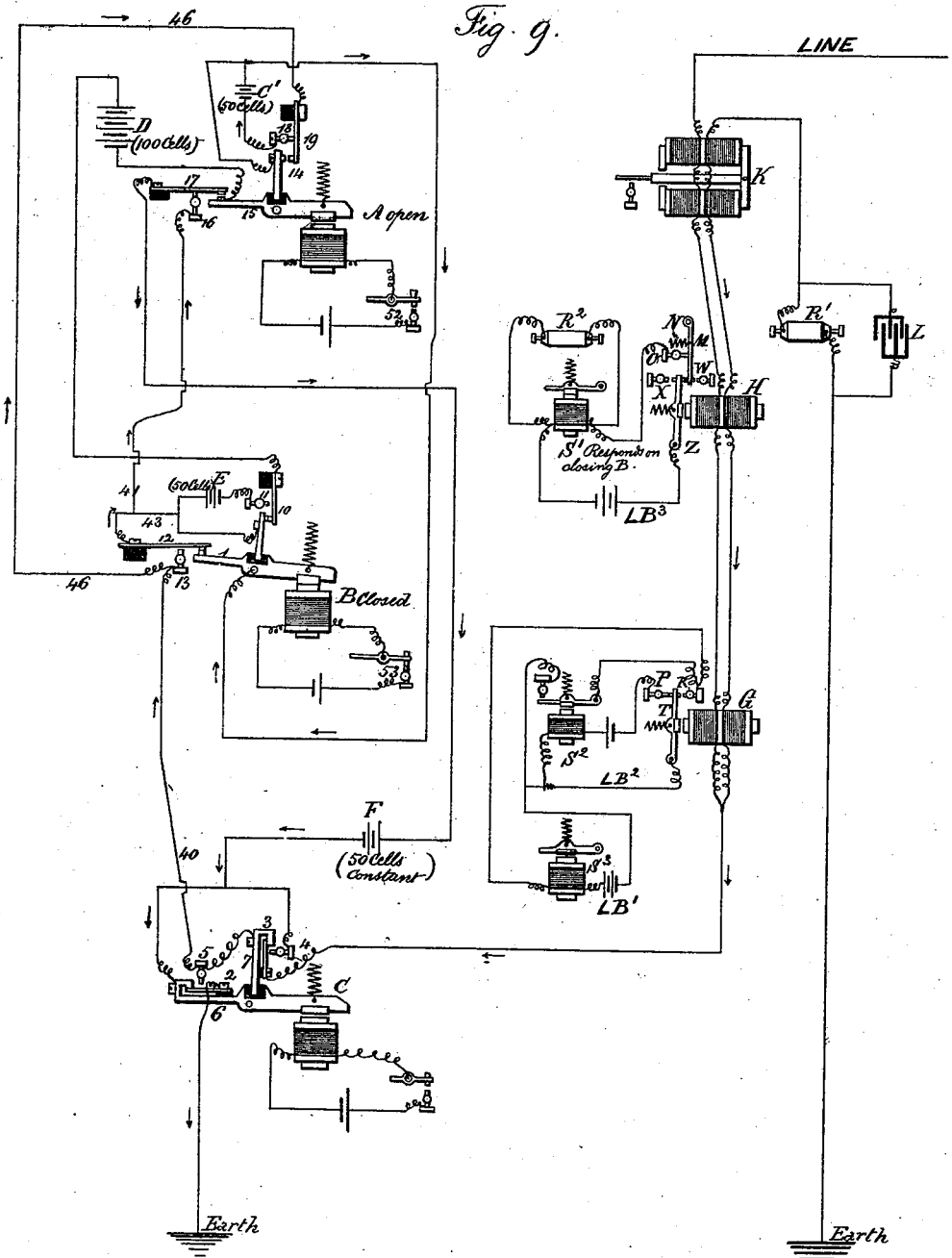

5 Sheets—Sheet 5.
T. A. EDISON.
SEXTUPLEX TELEGRAPH.
No. 512,872. Patented Jan. 16, 1894.
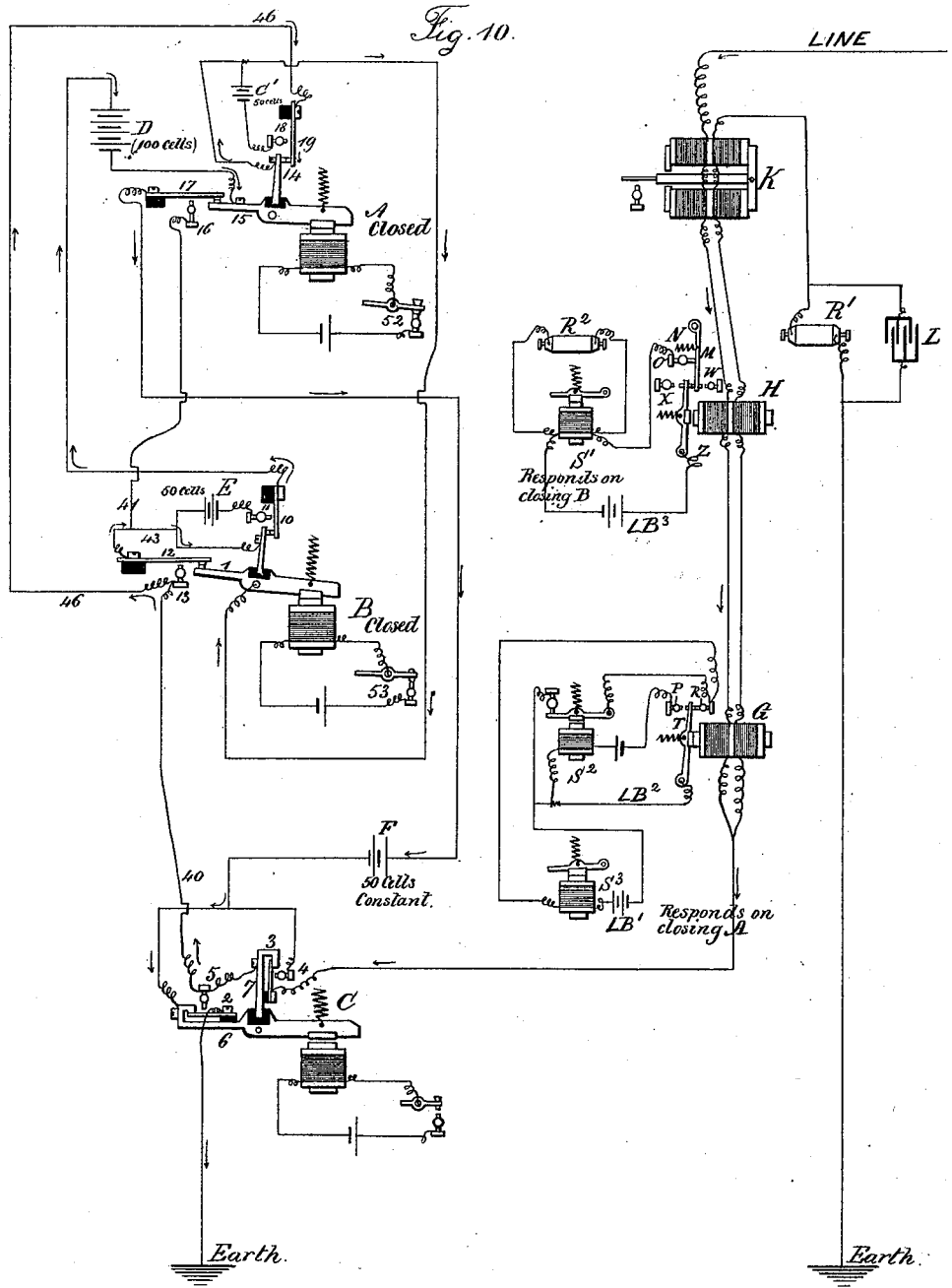

UNITED STATES PATENT OFFICE.

THOMAS A. EDISON, OF MENLO PARK, NEW JERSEY, ASSIGNOR TO THE WESTERN UNION TELEGRAPH COMPANY, OF NEW YORK, N. Y.

SEXTUPLEX TELEGRAPH.

SPECIFICATION forming part of Letters Patent No. 512,872, dated January 16, 1894.

Application filed June 2, 1877. (No model.)

*To all whom it may concern:*

Be it known that I, THOMAS A. EDISON, of Menlo Park, in the county of Middlesex and State of New Jersey, have invented an Improvement in Sextuplex Telegraphs, of which the following is a specification.

The object of this invention is to transmit six different messages over one wire at the same time, three in one direction and three in the opposite direction.

In my application No. 140 I have shown three electrically connected keys at one station and three receiving instruments operating independently at the distant station, two signals being given by battery currents of different strengths, and one by the reversal of the polarity. This feature therefore is not herein claimed.

In my application No. 138, one portion or section of battery remains constantly on line and other portions or sections of which are thrown in and out by the keys. I do not therefore herein claim such devices.

In telegraph instruments supplemental contact levers have been operated by the armature lever to open and close shunt connection.

One portion of my present invention relates to the combination with a sounder and local circuit of a relay magnet, armature lever and local circuit breaking lever.

The invention further consists in devices, connections and arrangements of the sounders, local batteries and connecting wires and relay instruments at the receiving station, for the purpose of causing the two messages transmitted by an increase and decrease in the strength of the current to be distinctly sounded upon their respective sounders and to prevent the change in the polarity of the current from mutilating the signals of such messages.

The invention further consists in the devices, connection and arrangement of the several receiving instruments to produce a balance or neutralization of the effects of the outgoing currents upon such relays at the same station and in devices whereby the effect of the static charge of the line is compensated for.

Figure 1:
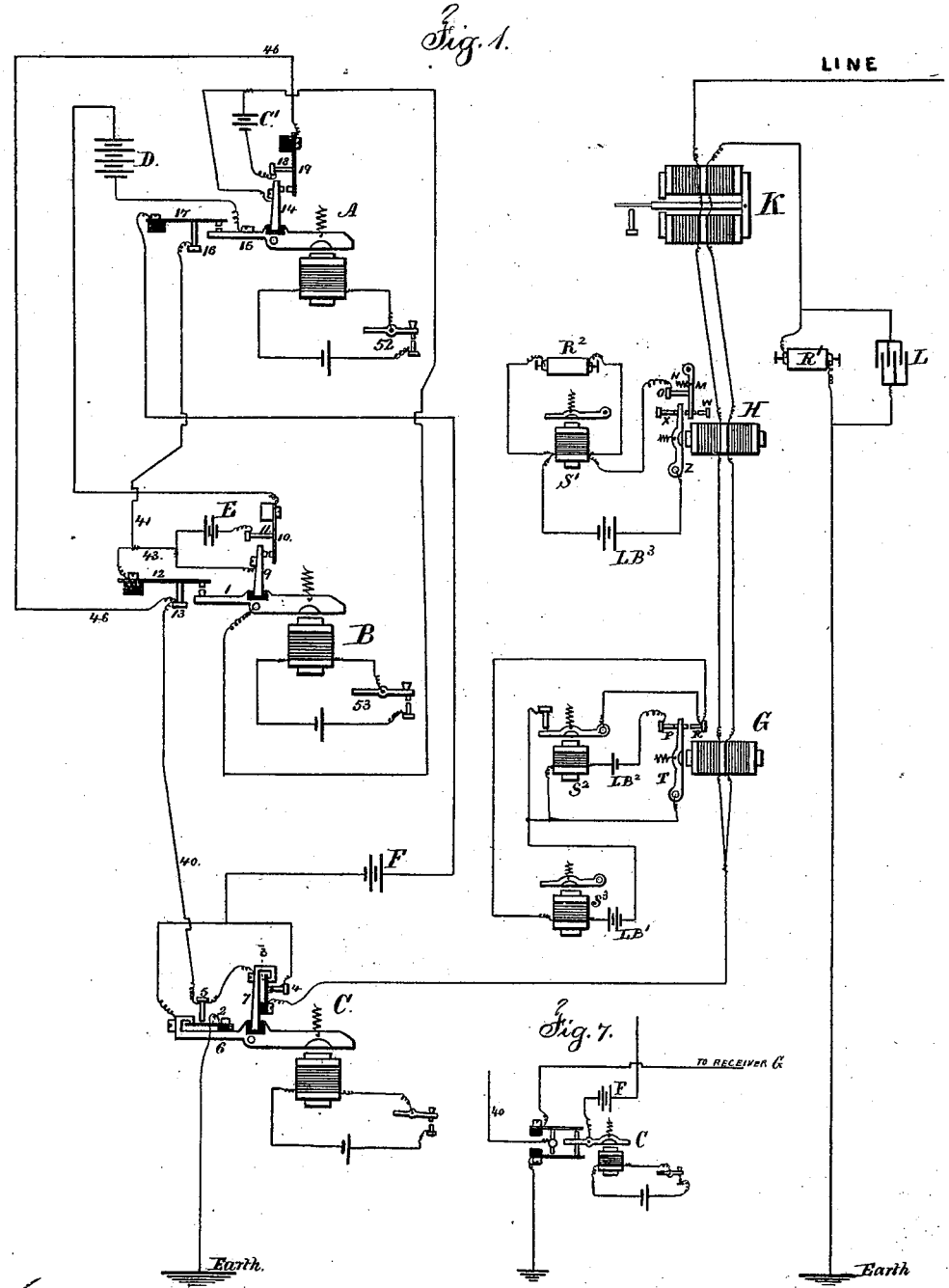

The general operation may be stated as follows:—The message transmitted by key C, Fig. 1, is received on instrument K by reversal of polarity, there being always a small battery on the line sufficient for this purpose. When key A. is closed, the signal is given on G by say one hundred or one hundred and fifty cells brought into circuit. When key A. is opened either fifty cells are on line or else no extra battery, but G does not respond to the fifty cells. When key B. is closed, the signal is received on H. the battery power of fifty or one hundred cells being operative, and when the key is open, there is either no extra battery power or the highest, say one hundred and fifty cells, the relay instruments acting with both G and H being constructed and adjusted as hereinafter described to respond only to the proper strength of currents regardless of reversal by C.

Figure. 1 shows the connections at one terminal station; for convenience of explanation a portion of the connections are not shown in this figure but are shown in Figs. 2, 3, 4, 5, 6 and 7. Fig. 8. is a diagram corresponding to Fig. 1, with the key A. closed. Fig. 9. is a similar view with the key B. closed, and Fig. 10. is a similar diagram with both keys A. and B. closed.

The receiving instruments respond to the incoming current from the distant station but for convenience of illustration the receiving instruments are represented as responding to the corresponding transmitting keys.

C. is the transmitter which serves to reverse the direction of the flow of the current over the wire from the battery F, which remains constantly on the line, and any additional battery which may be inserted or withdrawn from the circuit by the manipulation of the transmitters A. and B. The reversals of the direction of flow over the wire sets in motion the tongue of the polarized relay K. at the distant station, the attraction of C. by its magnet causing the tongue of K to be attracted toward one pole and the recession of C. from its magnet transmits a current of opposite polarity, causing the tongue of K to be attracted by the other pole whether the battery F is alone in circuit or the batteries D and E are included.

For convenience of explanation I will call the batteries F. C'. and E. fifty cells each, and D. one hundred (100) cells.

A. is a transmitter which serves to transmit when B. is unattracted by its magnet, by always adding the battery D of one hundred cells, which passing over the line to the distant station causes the lever T of the relay G. to be attracted. This lever T. is so adjusted that the constant current of F which always circulates on the line, does not affect it. This lever striking the point R. closes the signaling magnet $S^3$, by its local battery L B'. at the same time the local circuit in which the sounder $S^2$. is inserted is broken, and its lever comes in contact with its back point, thus closing the circuit of $S^3$. in two places, the object of the sounder $S^2$. being to prevent a mutilation of a signal at the moment when the cores of G. are changing their polarity due to a reversal in the direction of the flow of the current. At the moment when the cores of G. are changing their polarity, the lever T. may fly away from the point R. and it would break the circuit of $S^3$. were it not secured from being thus broken by the contact of the lever of $S^2$. against its back point and although the lever T may touch the point P, it does not remain long enough to energize the magnet $S^2$. sufficiently to cause its lever to be attracted. Hence no mutilation of a signal takes place by a change in the polarity of the iron cores of G. due to reversals.

As before mentioned the relay at G. always responds and is adjusted for a strength of one hundred cells. In the act of transmitting with B. there are times when it receives a current of one hundred and fifty cells but this does not change its adjustment for it responds just the same whether one hundred cells are thrown in circuit or one hundred and fifty cells, but it is so adjusted that the addition of fifty cells over and above the constant current from battery F. does not affect it. Hence the closing signals are made upon the relay G. either by one hundred cells or one hundred and fifty cells, according to the position of the transmitter B. and no difficulty is experienced in obtaining clear, sharp and rapid signaling on this relay.

I will now describe the method of transmitting the third message: Suppose that the lever of A. is unattracted by its magnet and the lever of B. is also unattracted, and if the constant current from the battery F. is left out of consideration, there is no current actuating either the relays G. or H, and both sounders are open; if B. is now closed, the battery C'. of fifty cells is inserted, and the lever of H is attracted to the lever M. closing the local circuit of S'. which is shunted by a resistance to cause its own self-induced current to compensate for the effect of reversals. The tension of the spring N. on the lever M. is such that one hundred and fifty cells are required to overcome it. If while the transmitter B. is closed, and the battery C' has caused the lever of H, to close the local circuit through M and O, A. is closed, the battery C'. of fifty cells is thrown out of circuit and the battery D. of one hundred cells substituted, but as before mentioned, the tension of the spring N. of the lever M. is so great that one hundred cells will not cause it to be removed from O. Hence the sounder S'. still remains closed and A. can open and close without in the least affecting H. or its sounder. Now while A. is closed and has the one hundred cells battery D. in circuit, and B. desires to open, the battery E. of fifty cells is thrown in circuit and this fifty cells added to the one hundred cells of D causes the lever M to be drawn away from O. opening the local circuit and sounder and if A. opens, both batteries D and F. are disconnected and the lever of H flies back to X. its local circuit still remaining open; the period of time that Z. M and O. are in contact in the passage of Z. from W to X. is so infinitely small that the sounder S'. is unaffected by it.

To set forth the current strengths and manipulations more clearly and in a general way, I state that the message that is transmitted by A, and called the first message and received on G. is sent thus:—for a closing signal one hundred cells or one hundred and fifty cells; for an opening signal nothing or fifty cells. The constant battery for working by reversals is not taken into account.

The second message transmitted by B. and received on H. is sent thus:—for a closing signal fifty or one hundred cells; for an opening signal nothing or one hundred and fifty cells.

The third message transmitted by C. and received on K. is sent thus:—for a closing signal a positive current; for an opening signal a negative current or vice versa.

In the case of the first and second messages the signaling hand-keys 52. 53. which serve to operate A. and B. might be provided with back contact-points, or the connections in the transmitters reversed, which would reverse the order of the closing and opening signals, and repeating sounders with back points may be used to open the relays G and H but I prefer the arrangement and order described.

I will now describe the course of the currents in the various positions of the transmitters A. B. and C. In the case of the reversing transmitter C. it will be unnecessary to trace the direction of the current as it is already well known the reversing key being between the line and earth connections. A transmitter C. like that shown in Fig. 7. might take the place of the one represented in Fig. 1. Suppose that both A. and B. are open, The line enters the reverser C. by the spring 3. thence to the lever 7. thence by the wire 40. to the point 13. thence *via* wire 41. to the point 16. thence to the spring 17. and by wire to the battery F. thence to the lever 6. and spring 2. to earth. No current except the constant current from F, passes over the line, and the direction of the passage of that current over the line is reversed when C. is closed. Hence the relays G and H. at the distant station are open and the polarized magnet K only responds. If A. is closed, the line enters C. passes thence to the point 13. and by wire 43. through the battery E, and spring 10, thence to the battery D. and lever 15. to the spring 17. to the battery F. through the reverser to earth, thus putting on one hundred and fifty cells, F being constant; this causes the relay G to close its sounder, but the lever of H. is attracted to its front point and not remaining in the intermediate position its sounder is unaffected. When both A. and B. are closed the line enters the reverser C. thence by wires 40 and 46. to the spring 19. to the lever 14. thence to the lever 1. to the spring 12. thence by wire 43. and 9. to the spring 10. thence to the battery D. thence to the spring 17. to the battery F through the reverser to the earth, thus leaving one hundred cells on the line (F excepted.) This causes G at the distant end to close its sounder and the lever of H to be arrested in its intermediate position by the lever M and also close its sounder.

In Fig. 1 I have shown the ordinary Morse neutral relays H and G wound with double coils and worked "differentially" in company with the polarized relay K. under certain conditions, such as upon short circuits of small electro-static capacity. These relays and this arrangement are all that is required, and are preferable on account of their simplicity, but on longer circuits where the effect of static induction is to cause a mutilation of signals, I am compelled to modify the devices to some extent. The relay G may be a polarized one with a centered tongue shown in Fig. 6. G. is the polarized relay provided with two levers 1. and 2. which are held against the central point 7. (which in practice is composed of two adjustable screws) by the springs 3 and 4. thus holding the tongue centered equidistant from its two limiting points 9 and 10. and the tension of the springs 3. and 4. is such that the tongue is not affected either by the constant battery F. or the addition of fifty more cells thereto, but upon the addition of the battery D. of the transmitter A. the magnetism in the magnet of G. is sufficient to overcome the tension of the springs 3. and 4. of the levers 1. and 2. and one or the other, according to the polarity of the current is separated from 7. opening the local circuit of the repeating sounder S'. and this in its turn closes the local circuit of $S^2$: while thus closed the effect of reversals is to throw the tongue of G from 9 to 10. and in its passage closes the local of S'. but to such an unappreciable extent that S'. remains unaffected.

Figure 2:
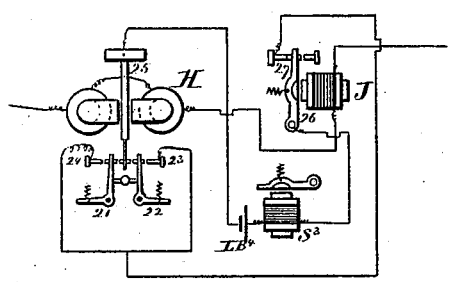
Figure 6:
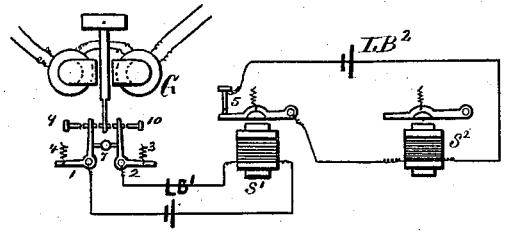

Having thus described the relay suitable for long lines to replace G, I will describe the relay or relays which may take the place of the relay H, with long lines. This arrangement is shown in Fig. 2. H and J. are two relays, H being a polarized one, while J. is a neutral one. Both are to be wound with double coils. The tongue of H. is centered equidistant from its two limiting points 24 and 23. by the levers 22 and 21. in the same manner as G in Fig. 6. The retractile springs of 21. and 22. are so adjusted that independent of the constant current from the battery F it will be attracted to its limiting points by an addition of fifty cells. The relay J. is provided with a back contact point and responds only when both batteries D and E are in circuit that is to say, one hundred and fifty cells.

The operation is as follows: When A. and B. are open only the constant current of F circulates. Hence the tongue of H. is centralized and the lever of J. is in contact with its back point and the local circuit is interrupted by the non contact of the tongue of H. with either one or the other of its contact points 23. and 24. If now B. closes, the battery C'. of fifty cells is inserted and the tongue is attracted to either the limiting point 23 or 24. according to the direction of the flow of the current, and the lever of J. remaining in contact with its back point, the local circuit and sounder $S^3$. are closed: while thus closed, if the current is reversed, the tongue passes from one contact point to the other, keeping the local circuit still closed except a slight interval or break in its continuity in the passage of the tongue from one point to the other, which owing to the slow charging and discharging time of the iron core of the sounder $S^3$. is unappreciable and may be easily eradicated by shunting the sounder or using an auxiliary repeating sounder. Again, while the local circuit and sounder are closed the transmitter A. is closed, and the current is increased to one hundred, but as the lever of J. only responds to one hundred and fifty, the sounder $S^3$. remains unaffected; but if while A. is closed B opens; then the current is increased to one hundred and fifty cells, the contact between the lever of J and its back-point is broken and the local opens.

Figure 3:
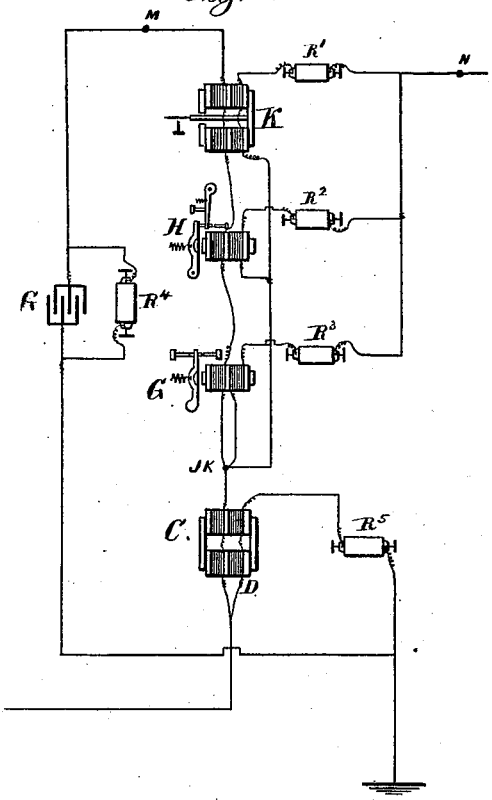

Fig. 3. shows a method of equating or balancing the effect of the outgoing current at the home station by the differential method slightly modified for the purpose of obtaining a more perfect balance of all the instruments and to a certain extent obtain the balance independent of each other, and to lessen the resistance of all the terminal connections to the end that the line may be discharged more rapidly of its static current, and it also shows the method that I adopt to compensate for the effects of static induction on the received current at the distant station. G, H and K, are relays similar to those shown in Fig. 1. The artificial line passes through the coils on each of the relays thence to the re-resistance $R^4$ and earth in the usual manner. But the line is divided into three derivations, each derivation passing through a coil on its relay and to an adjustable resistance coil to the line. This lessens generally the line resistance of the terminals and allows of a rapid discharge of the static current. At the same time it has the advantage that each relay may be accurately balanced to a great extent independent of its neighbor, a very essential thing where a number of relays is to be used in this connection as in practice it is difficult to wind coils which are all alike, or if alike, will produce the same magnetic effect when the current is passed directly through them. My object is not to use $R'$, $R^2$, and $R^3$, for equating, but in the first instance to obtain an equalization of all the relays and then the balance may be obtained in the usual manner with $R^4$. These derivations act as shunts around the relays and would produce a bad effect were it not that the self induction current of all the relays are the same in strength and direction. Hence they cannot circulate within the derivation but pass into the line and circulate within the total resistance of the main line in the usual manner. C. D. is an induction coil magnet, one coil C. being in the omnibus line leading to the differential system. D. is another coil connected through a derivation formed by a resistance $R^5$. to the earth. The effect of the insertion of this inductive magnet is to increase the strength of the first portion of each signal whether due to an increase or a reversal of the current, and this increase of the first portion of the signal obviates to a great extent the effect of static induction upon the receiving instruments at the distant station. At the moment of reversal a powerful current passes through D to the earth and this reversing the polarity of the iron cores, induces a very powerful current into C and the line and artificial circuit, and on reversing the direction of the flow of the current, the same effect takes place in the opposite direction. This compensation has its effect at the distant station only. At that station or at both terminals when the line has great electro-static capacity, in addition to the compensation from the induction magnet C, D, I add powerful condensers on each side of the relays as in Fig. 5. the effect of which in the case of reversals, is to strengthen the first portion of each signal: in Fig. 3, the condensers $Cr'$ and $Cr^2$ would be connected at N. M. and J K.

Figure 4:
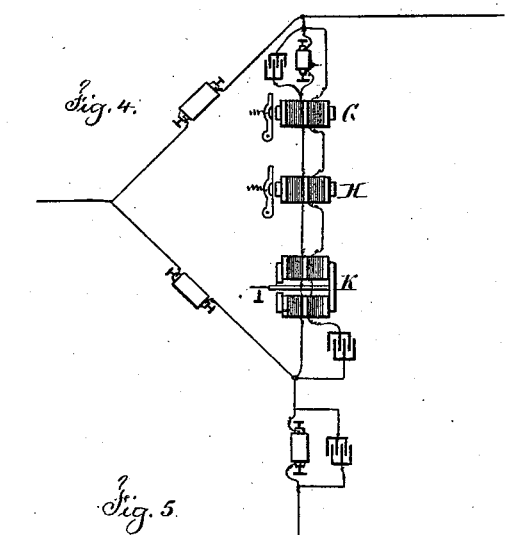
Figure 5:
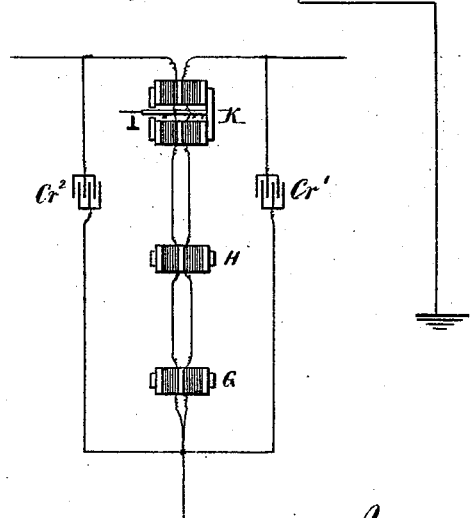

Under conditions where the employment of the differential system of balancing is inadmissible, I use the bridge arrangement shown in Fig. 4. All the relays are inserted in the bridge-wire, and the bridge wire contains a resistance shunted with a condenser. In addition to this condenser I wind the relays with double coils and form a second bridge wire which includes the second coils and a powerful condenser, but continuity in this case is not preserved the second coils being energized purely by induction. The combined induction of the two condensers serves to strengthen the first portion of the received signal. I make the sides of the bridge unequal so as to lessen the effect of the self induction of the relays in the bridge by increasing its resistance, as a shunt around such relays and also for the purpose of obtaining a balance without materially weakening the main current through the relays or shunting it to earth by other routes, thus losing great margin in working strength.

I will mention that this apparatus may be used for single, duplex, quadruplex or sextuplex transmission.

I claim as my invention—

1. The combination in a sextuplex telegraph of a reversing key C, with two transmitters A, and B, and their batteries and circuit connections substantially as set forth, whereby the transmitter A, places to line currents of greatest strength and the transmitter B, those of least strength, and the transmitter B, when closed lessens the currents put to line by the transmitter A, and the transmitter A increases the currents put to line by the transmitter B, substantially as set forth.

2. In a multiplex telegraph, differential relay magnets in the respective circuits in combination with shunt connections in the respective circuits around the relay magnets and condensers of equal or nearly equal electrostatic capacity in the respective shunts substantially as specified.

3. The polarized relay H, having a central tongue, the relay $S'$, in a normally closed local circuit, the sounder $S^2$, in a normally open circuit, said circuits being arranged and operating substantially in the manner and for the purposes set forth.

4. The combination of three relays provided with double coils, one set of coils being inserted in the artificial or equating line and the other coils placed in derivations of the main line wire, such derivations containing resistance coils, the parts being arranged substantially as and for the purpose set forth.

5. The combination with quadruplex or sextuplex transmitters, of an induction coil at each terminal station, the primary being energized by a current from the transmitting batteries passing through it by a derivation leading to the earth arranged and operating substantially as described, and for the purpose of aiding the pulsation transmitted to the distant station as set forth.

6. The combination in a sextuplex telegraph of a polarized relay H, having a centered tongue with a neutral relay J, and the local battery and connection arranged and operated substantially as shown for the purpose set forth.

Signed by me this 31st day of May, A. D. 1877.

THOS. A. EDISON.

Witnesses:
 GEO. G. PINCKNEY,
 HAROLD SERRELL.